United States Patent
Yarimi et al.

(10) Patent No.: US 11,842,051 B2
(45) Date of Patent: Dec. 12, 2023

(54) INTELLIGENT DEFRAGMENTATION IN A STORAGE SYSTEM

(71) Applicant: Dell Products L.P., Round Rock, TX (US)

(72) Inventors: Michal Yarimi, Rehovot (IL); Itay Keller, Tel Aviv (IL)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/583,787

(22) Filed: Jan. 25, 2022

(65) Prior Publication Data

US 2023/0236966 A1    Jul. 27, 2023

(51) Int. Cl.
*G06F 3/06*       (2006.01)
*G06F 12/06*      (2006.01)
*G06F 16/17*      (2019.01)

(52) U.S. Cl.
CPC ............ *G06F 3/0611* (2013.01); *G06F 3/061* (2013.01); *G06F 3/064* (2013.01); *G06F 3/0608* (2013.01); *G06F 3/0613* (2013.01); *G06F 3/0638* (2013.01); *G06F 3/0643* (2013.01); *G06F 3/0644* (2013.01); *G06F 3/0652* (2013.01);
(Continued)

(58) Field of Classification Search
CPC ............ G06F 12/0646; G06F 16/1724; G06F 3/0608; G06F 3/0611; G06F 3/0638; G06F 3/0683; G06F 2212/7201; G06F 3/061; G06F 3/0613; G06F 3/064; G06F 3/0643; G06F 3/0644; G06F 3/0652; G06F 2206/1004; G06F 3/067; G06F 3/068
See application file for complete search history.

(56) References Cited

U.S. PATENT DOCUMENTS 5,381,539 A    1/1995  Yanai et al.
5,551,003 A    8/1996  Mattson et al.
(Continued)

FOREIGN PATENT DOCUMENTS

WO          2015108670 A1    7/2015
WO  PCT/US2019/024885        1/2020
(Continued)

OTHER PUBLICATIONS

FragPicker: A New Defragmentation Tool for Modern Storage Devices by Park (Year: 2021).*

(Continued)

*Primary Examiner* — Paul M Knight (74) *Attorney, Agent, or Firm* — Ryan, Mason & Lewis, LLP (57) ABSTRACT

Techniques are provided for implementing intelligent defragmentation in a storage system. A storage control system manages a logical address space of a storage volume. The logical address space is partitioned into a plurality of extents, wherein each extent comprises a contiguous block of logical addresses of the logical address space. The storage control system monitors input/output (I/O) operations for logical addresses associated with the extents, and estimates fragmentation levels of the extents based on metadata associated with the monitored I/O operations. The storage control system identifies one or more extents as candidates for defragmentation based at least on the estimated fragmentation levels of the extents.

20 Claims, 5 Drawing Sheets

(52) U.S. Cl.
CPC ........ *G06F 3/0673* (2013.01); *G06F 12/0646* (2013.01); *G06F 16/1724* (2019.01); *G06F 3/0683* (2013.01); *G06F 2212/7201* (2013.01)

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 7,409,522 | B1* | 8/2008 | Fair .................. G06F 12/023 711/158 |
| 7,603,529 | B1* | 10/2009 | MacHardy ............ G06F 3/0689 711/170 |
| 8,793,290 | B1* | 7/2014 | Pruthi .................. G06F 3/0604 707/821 |
| 8,818,966 | B1* | 8/2014 | Nanda ................. G06F 16/1724 711/170 |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,658,777 | B2* | 5/2017 | Duzly .................. G06F 3/0643 |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1* | 11/2009 | Jacobson ............. G06F 3/0611 711/202 |
| 2012/0278560 | A1* | 11/2012 | Benzion ............. G06F 12/0862 711/137 |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1* | 8/2014 | Ezra ..................... G06F 3/0614 711/133 |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2018/0349402 | A1* | 12/2018 | Stouder-Studenmund .................. G06F 16/1724 |
| 2019/0163587 | A1 | 5/2019 | Anna et al. |
| 2019/0227845 | A1 | 7/2019 | Sridhar et al. |
| 2019/0324683 | A1* | 10/2019 | Li ......................... G06F 3/0658 |
| 2020/0133503 | A1 | 4/2020 | Sun et al. |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1 | 9/2021 | Lieblich et al. |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2021/0389876 | A1* | 12/2021 | Muthiah ............. G06F 3/0608 |
| 2022/0004320 | A1 | 1/2022 | Matosevich et al. |
| 2022/0236872 | A1* | 7/2022 | Mahmood ............. G06F 3/064 |
| 2022/0413729 | A1* | 12/2022 | Sharma ................ G06F 3/0659 |
| 2023/0108949 | A1* | 4/2023 | Moore ................ G06F 16/1734 707/693 |
| 2023/0195353 | A1* | 6/2023 | Zilberstein ............ G06F 3/0655 711/154 |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

Defragmenting really speeds up Windows NT machines by Robb (Year: 2000).*
Dell EMC, "Dell EMC VxRack FLEX," Dell EMC Product Overview, 2018, 5 pages.
G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006.1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting To Know Dell EMC PowerFlex, " Version 3.5.x, Rev. 02, Jan. 2021, 66 pages.
U.S. Appl. No. 16/983,423, filed in the name of Dan Aharoni et al. Aug. 3, 2020, and entitled "Deferred Reclamation of Invalidated Entries that are Associated with a Transaction Log in a Log-Structured Array."
U.S. Appl. No. 17/065,754, filed in the name of Dan Aharoni et al. Oct. 8, 2020, and entitled "Direct Response to IO Request in Storage System with Remote Replication."
U.S. Appl. No. 17/070,073, filed in the name of Dan Aharoni et al. Oct. 14, 2020, and entitled "Direct Response to IO Request in Storage System Having an Intermediary Target Apparatus."
U.S. Appl. No. 17/070,288, filed in the name of Anurag Sharma et al. Oct. 14, 2020, and entitled "Pipeline-Based System for Configuration Checking and Reporting Associated with an Information Processing System."
U.S. Appl. No. 17/071,407, filed in the name of John Moran et al. Oct. 15, 2020, and entitled "Dynamic Remediation Actions in Response to Configuration Checks in an Information Processing System."
U.S. Appl. No. 17/077,105, filed in the name of Yosef Shatsky et al. Oct. 22, 2020, and entitled "Volume Tiering in Storage Systems."
U.S. Appl. No. 17/106,988, filed in the name of Rivka Matosevich et al. Nov. 30, 2020, and entitled "Managing Host Connectivity to a Data Storage System."

(56) References Cited

OTHER PUBLICATIONS

U.S. Appl. No. 17/123,525, filed in the name of Itay Keller et al. Dec. 16, 2020, and entitled "Deferred Reclamation of Invalidated Entries Associated with Replication in a Log-Structured Array."
U.S. Appl. No. 17/145,646, filed in the name of Yosef Shatsky et al. Jan. 11, 2021, and entitled "Redistribution of Processing Groups between Server Nodes Based on Hardware Resource Utilization."
U.S. Appl. No. 17/232,203, filed in the name of Roman Spiegelman Apr. 16, 2021, and entitled "Object Synchronization of Server Nodes in a Network Computing Environment."
U.S. Appl. No. 17/236,256, filed in the name of Doron Tal et al. Apr. 21, 2021, and entitled "Recovery from Partial Device Error in Data Storage System."
U.S. Appl. No. 17/306,601, filed in the name of Rivka Matosevich et al. May 3, 2021, and entitled "Managing Replication Journal in a Distributed Replication System."
U.S. Appl. No. 17/308,166, filed in the name of Adi Bar Shalom et al. May 5, 2021, and entitled "Journal Barrier Consistency Determination."
U.S. Appl. No. 17/351,733, filed in the name of Yosef Shatsky et al. Jun. 18, 2021, and entitled "Data Deduplication in a Disaggregated Storage System."
U.S. Appl. No. 17/361,666, filed in the name of Yosef Shatsky et al. Jun. 29, 2021, and entitled "Tracking Utilization of Data Blocks in a Storage System."
U.S. Appl. No. 17/511,695, filed in the name of Yosef Shatsky et al. Oct. 27, 2021, and entitled "Write Cache Management."
U.S. Appl. No. 17/511,699, filed in the name of Yosef Shatsky et al. Oct. 27, 2021, and entitled "Metadata Management in Storage Systems."
U.S. Appl. No. 17/512,890, filed in the name of Yosef Shatsky et al. Oct. 28, 2021, and entitled "Utilizing Checkpoints for Resiliency of Metadata in Storage Systems."
U.S. Appl. No. 17/569,198, filed in the name of Yosef Shatsky Jan. 5, 2022, and entitled "Utilizing a Persistent Write Cache as a Redo Log."
U.S. Appl. No. 17/583,365, filed in the name of Doron Tal et al. Jan. 25, 2022, and entitled "Data Deduplication in a Storage System."

* cited by examiner

| S1 | S2 | S3 | S4 | S5 | S6 | S7 | S8 | S9 | S10 |
|---|---|---|---|---|---|---|---|---|---|
| 0 | -1 | 50 | 100 | 4 | -1 | -1 | 0 | 0 | 0 |

INTELLIGENT DEFRAGMENTATION IN A STORAGE SYSTEM

TECHNICAL FIELD

This disclosure relates generally to data storage management techniques and, in particular, to techniques for implementing defragmentation in a data storage system.

BACKGROUND

Defragmentation is a process of reorganizing stored data of a storage device to minimize fragmentation of the data and thereby increase the proficiency of access to the stored data. A fragmented storage space can negatively impact storage system performance with regard to, e.g., rebuild operations, read/write throughput of larger granularities, capacity reclaim processes, etc., when there are no background processes to perform defragmentation. In particular, a fragmentated storage space can result in degraded read performance for large or sequential reads that need to access smaller portions of written data at different physical locations and combine the accessed data to compose the read output.

Conventional defragmentation techniques typically implement a simple background process that iterates over all the user data or the volume address space to determine whether fragmentation is needed, and then proceed to defragment portions of the storage space that is deemed fragmented. Such conventional defragmentation techniques consume a significant amount of system resources (e.g., central process unit (CPU) cycles, input/output (I/O) bandwidth, etc.), which can result in wasted throughput and decrease overall storage system performance. In this regard, defragmentation should be implemented in a way that minimizes the impact on storage system performance.

SUMMARY

Exemplary embodiments of the disclosure include techniques for implementing intelligent defragmentation in a storage system. For example, an exemplary embodiment includes a method that is performed by a storage control system which manages a logical address space of a storage volume, wherein the logical address space is partitioned into a plurality of extents, wherein each extent comprises a contiguous block of logical addresses of the logical address space. The storage control system monitors input/output (I/O) operations for logical addresses associated with the extents, and estimates fragmentation levels of the extents based on metadata associated with the monitored I/O operations. The storage control system identifies one or more extents as candidates for defragmentation based at least on the estimated fragmentation levels of the extents.

Other embodiments of the disclosure include, without limitation, systems and articles of manufacture comprising processor-readable storage media, which are configured to implement intelligent defragmentation in a storage system.

DETAILED DESCRIPTION

Exemplary embodiments of the disclosure will now be discussed in further detail with regard to systems and methods for implementing intelligent defragmentation in a storage system. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
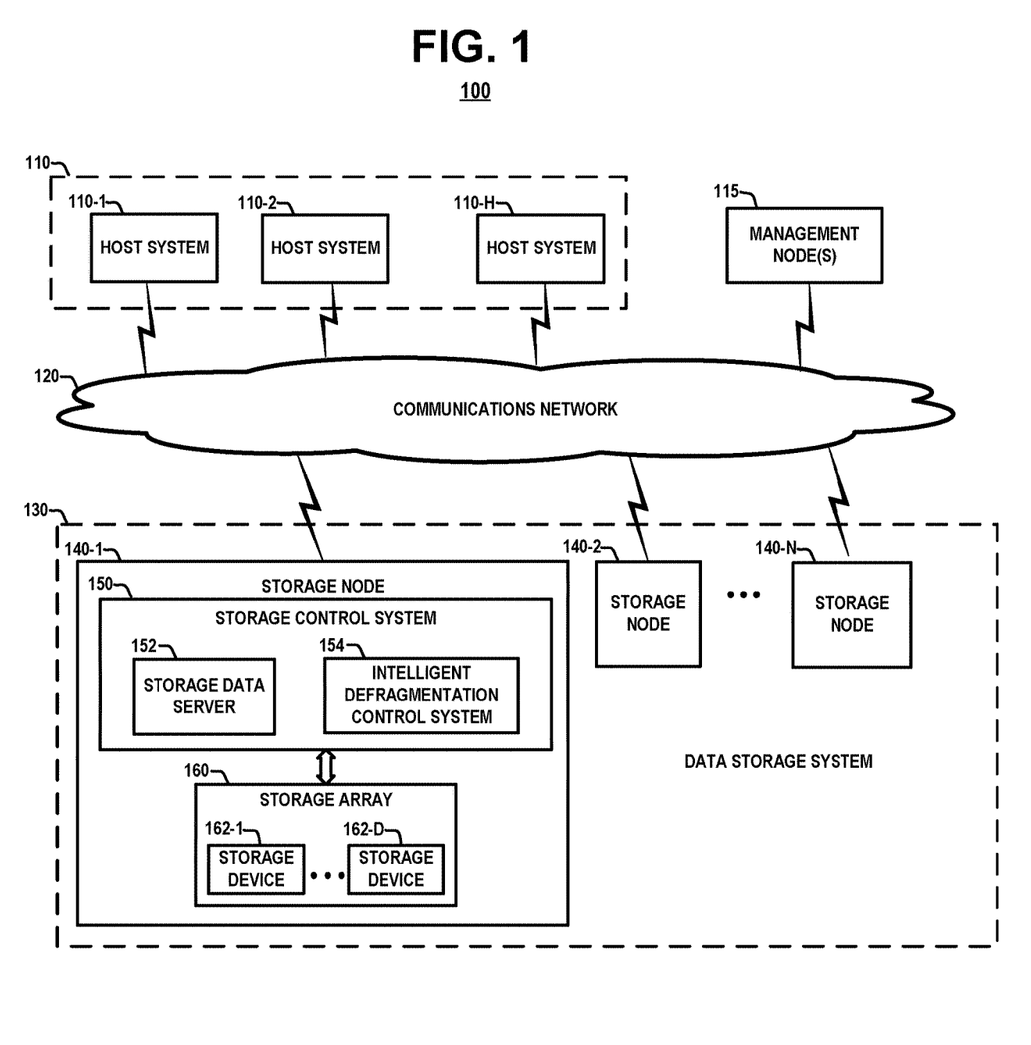
FIG. 1 schematically illustrates a network computing system comprising a storage system which implements an intelligent defragmentation control system, according to an exemplary embodiment of the disclosure.

FIG. 1 schematically illustrates a network computing system comprising a storage system which implements an intelligent defragmentation system, according to an exemplary embodiment of the disclosure. The network computing system 100 comprises one or more host systems 110-1, 110-2, . . . 110-H (collectively, host systems 110), one or more management nodes 115, a communications network 120, and a data storage system 130. The data storage system 130 comprises one or more storage nodes 140-1, 140-2, . . . , 140-N (collectively, storage nodes 140). As shown in FIG. 1, the storage node 140-1 comprises a storage control system 150, and a storage array 160 comprising a plurality of storage devices 162-1, . . . , 162-D (collectively, storage devices 162). The storage control system 150 comprises a storage data server 152, and an intelligent defragmentation control system 154, the functions of which will be described in further detail below. In some embodiments, the other storage nodes 140-2 . . . 140-N have the same or similar configuration as the storage node 140-1 shown in FIG. 1.

In general, the management nodes 115 implement application programming interfaces (APIs) to enable manual, automated, and/or semi-automated configuration, management, provisioning, and monitoring of the data storage system 130 and the associated storage nodes 140. In some embodiments, the management nodes 115 comprise standalone dedicated management server nodes, which may comprise physical and/or virtual server nodes.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. In some embodiments, the host systems 110 include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in the storage arrays 160 of the storage nodes 140 and (ii) read requests to access data that is stored in storage arrays 160 of the storage nodes 140.

The communications network 120 is configured to enable communication between the host systems 110 and the storage nodes 140, and between the management nodes 115, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communications network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement input/output (I/O) channels and support storage network connectivity. Numerous alternative networking arrangements are possible in a given embodiment, as will be appreciated by those skilled in the art.

The data storage system 130 may comprise any type of data storage system, or combination of data storage systems, including, but not limited to, a storage area network (SAN) system, a network-attached storage (NAS) system, a direct-attached storage (DAS) system, dynamic scale-out data storage systems, or other types of distributed data storage systems comprising software- defined storage, clustered or distributed virtual and/or physical infrastructure. The term "data storage system" as used herein should be broadly construed and not viewed as being limited to storage systems of any particular type or types. It is to be noted that each storage node 140 and its associated storage array 160 is an example of what is more generally referred to herein as a "storage system" or a "storage array." The storage nodes 140 can be physical nodes, virtual nodes, and a combination of physical and virtual nodes.

In some embodiments, the storage nodes 140 comprise storage server nodes (e.g., server node 600, shown in FIG. 6) which comprise processors and system memory, and host virtual machines and/or containers, although numerous other configurations are possible. In some embodiments, one or more of the storage nodes 140 can additionally implement functionality of a compute node, and vice-versa, wherein a compute node is configured to process data and execute tasks/workloads and perform computational work, either individually, or in a distributed manner, to thereby provide compute services such as execution of one or more applications on behalf of one or more users. In this regard, the term "storage node" as used herein is therefore intended to be broadly construed, and a storage system in some embodiments can be implemented using a combination of storage nodes and compute nodes.

In some embodiments, each storage node 140 comprises a server node that is implemented on, e.g., a physical server machine or storage appliance comprising hardware processors, system memory, and other hardware resources that execute software and firmware to implement the functionalities and data management services of the storage node 140 and the storage control system 150, as discussed herein. More specifically, in some embodiments, each storage node 140 comprises a plurality of storage control processors which execute a lightweight operating system (e.g., a customized lightweight Linux kernel) and functional software (e.g., software-defined storage software) to implement various functions of the storage node 140 and the storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the data storage system 130, etc.

In a distributed storage environment, the storage control systems 150 of the storage nodes 140 are configured to communicate in a cooperative manner to perform functions such as e.g., processing data access requests received from the host systems 110, aggregating/pooling the storage capacity of storage arrays 160 of the storage nodes 140, performing functions such as inline data compression/decompression, data deduplication, thin provisioning, and data protection functions such as data replication, snapshot, and data protection and resiliency schemes based on data striping and/or parity (e.g., erasure coding, RAID, etc.), and other types of data management functions, depending on the system configuration.

The storage devices 162 comprise one or more of various types of storage devices such as hard-disk drives (HDDs), solid-state drives (SSDs), Flash memory cards, or other types of non- volatile memory (NVM) devices including, but not limited to, non-volatile random-access memory (NVRAM), phase-change RAM (PC-RAM), magnetic RAM (MRAM), etc. In some embodiments, the storage devices 162 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the data storage system 130. In this regard, the term "storage device" as used herein should be broadly construed to encompass all types of persistent storage media including hybrid drives.

In some embodiments, the storage array 160 of a given storage node 140 comprises DAS resources (internal and/or external), wherein the storage control system 150 of the given storage node 140 is configured to directly access the storage array 160 of the given storage node 140. In some embodiments, the data storage system 130 comprises a disaggregated data storage system in which storage data processing is separate from data storage. More specifically, in an exemplary embodiment of a disaggregated storage system, the storage control systems 150 comprise storage control nodes, and the storage arrays 160 comprise storage nodes, which are separate from the storage control nodes. In such a configuration, the storage control systems 150 are configured to handle the processing of data associated with data access requests (i.e., I/O read and write requests), and the storage arrays 160 are configured to handle writing/reading data to/from respective storage devices 162. In a disaggregated architecture, each storage control system 150 would be configured to directly access data stored in each storage array 160 in the data storage system 130. The disaggregated storage system architecture essentially separates the storage control compute layers (e.g., storage control systems 150) from the data storage layers (e.g., storage arrays 160).

In a disaggregated data storage system, each storage array 160 is implemented as, e.g., an external DAS device, wherein each storage control system 150 of each storage node 140-1, 140-2, . . . , 140-N is connected to each storage array 160 using any suitable interface protocol such as Small Computer Systems Interface (SCSI), Fibre Channel (FC), etc. In other embodiments, the storage control systems 150 of each storage node 140-1, 140-2, . . . , 140-N can be network-connected to each of the storage arrays 160 (via a high-performance network fabric) using any suitable network configuration and network interface protocol such as Ethernet, FC, Internet Small Computer Systems Interface (iSCSI), InfiniBand, etc. For example, in some embodiments, the storage control systems 150 and the storage arrays 160 are interconnected in a full-mesh network, wherein back-end interconnectivity is achieved using, e.g., a redundant high-speed storage fabric, wherein the storage control systems 150 can utilize remote procedure calls (RPC) for control messages and remote direct memory access (RDMA) for accessing data blocks.

In some embodiments, the storage data servers 152 of the storage nodes 140 are configured to consolidate the capacity of the storage arrays 160 (e.g., HDDs, SSDs, PCIe or NVMe flash cards, etc.) of the storage nodes 140 into storage pools from which logical volumes are allocated, wherein the logical volumes (e.g., a block unit of storage management) are identified by, e.g., logical unit numbers (LUNs). More specifically, the storage data servers 152 of the storage nodes 140 are configured to create and manage storage pools (e.g., virtual pools of block storage) by aggregating storage capacity of the storage arrays 160 of the storage nodes 140 and dividing a given storage pool into one or more volumes, wherein the volumes are exposed to the host systems 110 as block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In some embodiments, each host system 110 comprises a storage data client (SDC) which executes on the host system and which consumes the block storage exposed by the storage data servers 152. In particular, an SDC comprises a lightweight block device driver that is deployed on a given host system 110 to expose shared block volumes to the given host system 110. The SDC exposes the storage volumes as block devices to each application (e.g., virtual machine, container, etc.) that execute on the same server (e.g., host system 110) on which the SDC is installed. The SDC of a given host system 110 exposes block devices representing the virtual storage volumes that are currently mapped to the given host system 110. The SDC for a given host system 110 serves as a block driver for the host system 110, wherein the SDC intercepts I/O requests, and utilizes the intercepted I/O request to access the block storage that is managed by the storage data servers 152. The SDC provides the operating system or hypervisor (which runs the SDC) access to the logical block devices (e.g., volumes). Each SDC has knowledge of which storage data servers 152 hold (e.g., own) their block data, so multipathing can be accomplished natively through the SDCs.

As noted above, the management nodes 115 in FIG. 1 implement a management layer which manages and configures the network computing system 100. In some embodiments, the management nodes 115 comprise a tightly-coupled cluster of manager nodes that are configured to supervise the operations of the storage cluster and manage storage cluster configurations. For example, management nodes 115 include metadata manager (MDM) modules that operate outside of the data path and provide the relevant information to the SDCs and the storage data servers 152 to allow such components to control data path operations. The MDM modules are configured to manage the mapping of SDCs to the storage data servers 152 of the storage nodes 140. The MDM modules manage various types of metadata that are required to perform various management operations in the storage environment such as, e.g., managing configuration changes, managing the SDCs and storage data servers 152, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

For a given storage volume, the logical address space of the storage volume can be partitioned (sharded) across multiple storage nodes 140, wherein the storage control systems 150 of such storage nodes are responsible for managing the respective portions of the storage volume. In this regard, the intelligent defragmentation control system 154 of each storage control system 150 is configured to defragment a respective portion of the volume address space that is managed by the respective storage control system 150 to reduce fragmentation of, e.g., extents. It is to be understood that the term "extent" as used herein denotes a contiguous block of logical addresses of a logical address space within a volume, wherein an extent comprises a specified size that can be configured. In some exemplary embodiments, the storage space is configured such that each extent has a size of 128 KB, although such size can vary depending on the application. In some embodiments, the storage control system is configured to concurrently operate multiple instances of the intelligent defragmentation control system in the background at the same time, wherein each instance of the intelligent defragmentation control system is configured to control defragmentation operations for a respective one of the storage devices 162 of the storage array 160. In this regard, in some embodiments, defragmentation of extents is performed on a per storage device basis, wherein a storage device can be a physical storage device, or a logical device (e.g., a device cluster in which multiple storage devices are configured to operate as a single storage device).

Within a given extent, each logical address can be mapped to a corresponding physical address of a storage device 162 within the storage array 160. When the contiguous block of logical addresses of a given extent are mapped to a contiguous block of physical addresses, the given extent is considered unfragmented. On the other hand, when the contiguous block of logical addresses of a given extent are not mapped to a contiguous block of physical addresses, the given extent can be deemed fragmented. In some embodiments, a level (or percentage) of fragmentation of a given extent is determined based on factors including, but not limited to, the amount of physical addresses (mapped to logical addresses of the given extent) which are scattered in different (non-contiguous) locations within the storage array 160, an amount of unused space within the given extent between used logical addresses, etc.

In some embodiments, the intelligent defragmentation control system 154 of a given storage control system 150 is configured to monitor I/0 operations (e.g., read/write access patterns) for logical addresses associated with extents, utilize metadata associated with monitored I/O operations to estimate a level of fragmentation of the extents, and identify one or more candidate extents for defragmentation, based at least on the estimated level of fragmentation of the extents. A defragmentation operation is then performed to defragment one or more of the identified candidate extents so that the contiguous logical addresses of a defragmented extent are mapped to contiguous physical addresses. Exemplary systems and methods for performing intelligent defragmentation according to embodiments of the disclosure will now be discussed in further detail in conjunction with FIGS. 2-5.

Figure 2:
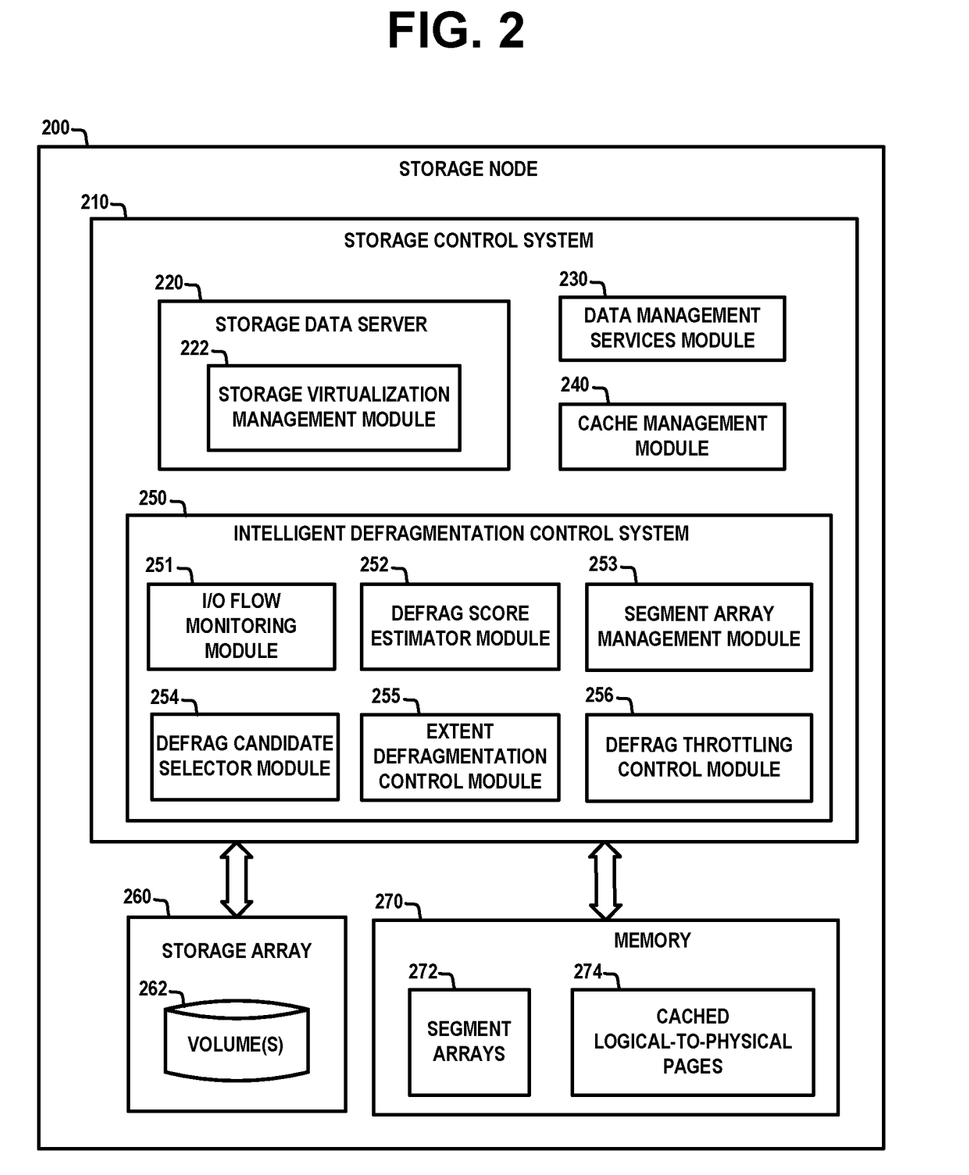
FIG. 2 schematically illustrates a storage node which implements an intelligent defragmentation control system, according to an exemplary embodiment of the disclosure.

FIG. 2 schematically illustrates a storage node which implements an intelligent defragmentation control system, according to an exemplary embodiment of the disclosure. In some embodiments, FIG. 2 schematically illustrates an exemplary architecture of the storage nodes 140 of the data storage system 130 of FIG. 1. As shown in FIG. 2, the storage node 200 comprises a storage control system 210 which implements a storage data server 220, a data management services module 230, a cache management module 240, and an intelligent defragmentation control system 250. The storage data server 220 comprises a storage virtualization management module 222. The intelligent defragmentation control system 250 comprises various modules including, but not limited to, an I/O flow monitoring module 251, a defragmentation score estimator module 252, a segment array management module 253, a defragmentation candidate selector module 254, an extent defragmentation control module 255, and a defragmentation throttling control module 256, the functions of which will be described in further detail below.

The storage node 200 further comprises a storage array 260 and memory 270. The storage array 260 comprises a plurality of storage devices, wherein each storage device comprises physical storage addresses that can be mapped to logical addresses of one or more volumes 262 (or portions of volumes) that are configured within the storage array 260.

In some embodiments, the volume(s) 262 have logical addresses that are partitioned into extents, and each storage device comprises physical addresses that are mappable to logical addresses such that each storage device comprises extents corresponding to a portion of the logical address space. In some embodiments, the memory 270 comprises volatile random-access memory (RAM) such as dynamic RAM (DRAM), synchronous DRAM (SDRAM), etc. The memory 270 is configured to store various in-memory metadata structures that are utilized to support intelligent defragmentation operations as discussed herein. For example, as shown in FIG. 2, the in-memory metadata structures include segment arrays 272, and cached logical-to-physical pages 274, the functions of which will be discussed in further detail below. In some embodiments where the intelligent defragmentation is performed on a per storage device basis (e.g., per physical storage device, or per logical storage device), the segment arrays 272 comprise one segment array per storage device maintained in the memory 270.

The storage data server 220 implements functions as discussed above such as processing I/O write and read requests received from host systems to write/read data to/from the storage array 260. The storage virtualization management module 222 implements any suitable logical volume management system which is configured to create and manage the storage volume(s) 262 by aggregating the capacity of the storage array 260 into one or more virtual storage pools that are thin-provisioned for maximum capacity, and logically dividing each storage pool into one or more storage volumes that are exposed as block devices (e.g., LUNs) to the applications or host systems 110 (FIG. 1) which consume the data. The cache management module 240 provisions and manages one or more in-RAM caches (e.g., read cache) in the memory 270. For example, in some embodiments, the cached logical-to-physical pages 274 are stored in a read cache.

The data management services module 230 implements one or more types of data management services including, but not limited to, inline data compression/decompression, thin provisioning, and data protection functions such as data replication, data backup, data snapshot, and data protection and resiliency schemes based on data striping and/or parity (e.g., erasure coding, RAID, etc.), and other types of data management functions, depending on the system configuration. In embodiments where the storage data server 220 abstracts the physical media (e.g., storage array 260) and presents logical (virtualized) addresses to users in the form of LUNs, the storage data server 220 generates and manages metadata to provide mapping between logical addresses and physical addresses (e.g., a logical-to-physical mapping directory) which is stored on disk, wherein at any given time, a plurality of logical-to-physical pages of the logical-to-physical mapping directory are swapped into the memory 270 and stored in a read cache during runtime (e.g., the cached logical-to-physical pages 274). In addition, the storage control system 210 generates and manages metadata which is utilized for managing snapshots, managing remote replication, managing deduplication, managing data compression, and maintaining resiliency related metadata (e.g., RAID), etc.

The various modules of the intelligent defragmentation control system 250 implement functions to enable the storage control system 210 to perform defragmentation operations on the storage devices. In some embodiments, as noted above, multiple instances of the intelligent defragmentation control system 250 concurrently operate (e.g., concurrent background defragmentation processes) to control defragmentation operations on respective storage devices.

In this regard, it is to be understood that the various functions of the intelligent defragmentation control system 250 as described hereafter relate to operations that are performed for a given storage device (e.g., a physical storage device, or a logical device). For example, the I/O flow monitoring module 251 implements methods that are configured to monitor I/O operations such as read/write access operations and patterns (e.g., sizes of writes), deletion operations, reclaim operations, merge operations, rebuild operations, etc., with respect to data that is stored on a given storage device. The storage control system 210 generates and maintains various types of I/O metadata associated with I/O operations during normal operation to support various functions related to I/O processing and other data management functions. In this regard, the I/O flow monitoring module 251 monitors and tracks the I/O operations and associated I/O metadata that is naturally generated by the storage control system 210 to determine when to trigger operations to estimate and/or update current fragmentation levels of extents.

The defragmentation score estimator module 252 implements methods that are configured to utilize the I/O metadata (which is naturally generated and maintained by the storage control system 210 to support storage control functions) to estimate a level of fragmentation of extents, and compute defragmentation scores for segments (which contain the extents) based at least in part on the estimated fragmentation levels of the extents. In some embodiments, a "segment" is a metadata page that contains logical-to-physical mapping information for one or more extents that are currently mapped to the given segment. The segments within a given volume are ordered by logical addresses in the volume.

The segment array management module 253 is configured to generate and maintain a segment array for a given storage device. As noted above, the segment array for the given storage device comprises an in-RAM metadata structure that is stored in the memory 270 (e.g., segment arrays 272). In some embodiments, the segment array for a given storage device comprises an array of segment scores for segments, wherein the segment score of a given segment is determined as a function of the fragmentation levels of the extents that are currently mapped to the given segment. At any given time, a segment may comprise one or more extents, or a portion of an extent. In some embodiments, metadata (e.g., segment scores) maintained in the segment arrays 272 is utilized to identify candidate extents for defragmentation.

The defragmentation candidate selector module 254 implements methods that are configured to identify candidate extents for defragmentation, and select one or more of the candidate extents for defragmentation. In some embodiments, the extents are selected for defragmentation based at least in part on the current segment scores of the segments that currently map to the extents. In some embodiments, the extents are selected for defragmentation based at least in part on the current segment scores of the segments, and priority scores that are determined and assigned to the segments based on the current segment scores. In some embodiments, the extents that are selected for defragmentation include extents that are, e.g., not marked for deletion, not being deleted, not being reclaimed for reuse, extents that are not mapped to a block of logical addresses that are currently being used for another operation and are locked for use via a try-lock process, etc.

The extent defragmentation control module 255 implements methods that are configured to execute background defragmentation operations to defragment the extents that are selected for defragmentation by the defragmentation candidate selector module 254. The defragmentation throttling control module 256 implements methods that are configured to throttle the background defragmentation operations that are performed by the extent defragmentation control module 255 to minimize I/O overhead and minimize any adverse impact on the operations of the storage control system 210 when performing other operations that require I/O processing (e.g., serving host I/O requests, etc.).

Figure 3:
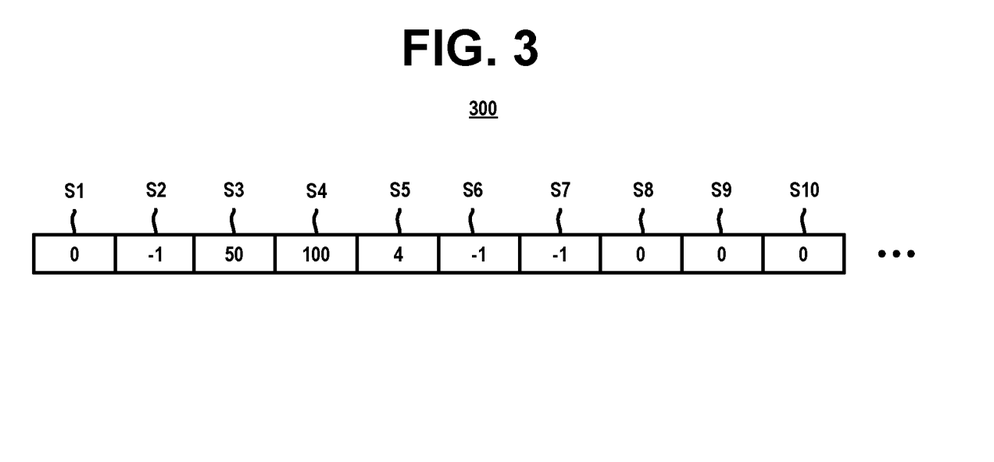
FIG. 3 schematically illustrates a segment array metadata structure which is utilized to implement intelligent defragmentation, according to an exemplary embodiment of the disclosure.

FIG. 3 schematically illustrates a segment array metadata structure which is utilized to implement intelligent defragmentation, according to an exemplary embodiment of the disclosure. More specifically, in some embodiments, FIG. 3 schematically illustrates a segment array 300 which is managed by the segment array management module 253 and stored in RAM memory 270. As shown in FIG. 3, the segment array 300 is a metadata structure which is configured to maintain an array of segment scores associated with a plurality of segments S1, S2, S3, S4, S5, S6, S7, S8, S9, S10, etc. In some embodiments, each segment S1, S2, S3, S4, S5, S6, S7, S8, S9, S10, etc. corresponds to a respective logical-to-physical metadata page (e.g., segment) that resides in the logical-to-physical mapping directory (on disk) and/or a respective logical-to-physical metadata page that currently resides in RAM cache memory (e.g., cached logical-to-physical pages 274).

At any given time, each segment S1, S2, S3, S4, S5, S6, S7, S8, S9, S10, etc., can be mapped to one or more extents or portions of extents, depending on the current state of the storage system (e.g., which logical addresses have been written to), wherein such mapping is determined using extent-to-segment mapping metadata. In some embodiments, extent-to-segment mapping metadata is naturally contained in (i) the logical-to-physical mapping directory which is stored on disk, and (ii) the cached logical-to-physical pages 274 of the logical-to-physical mapping directory that are swapped into the memory 270 and stored in a read cache during runtime. In some embodiments, a separate metadata structure is utilized to maintain extent-to-segment mapping metadata. In some embodiments, each segment entry in the segment array 300 comprises a segment identifier (ID) which corresponds to the offset of the segment entry in the segment array 300. For example, in the exemplary embodiment of FIG. 3, each segment S1, S2, S3, S4, S5, S6, S7, S8, S9, S10, etc., in the segment array 300 comprises a corresponding ID which corresponds to a sequential number of the corresponding segment entry in the segment array 300, e.g., segment ID=1, 2, 3, 4, 5, 6, 7, 8, 9, 10, etc. In this regard, the segment ID for a given segment is determined based on the offset of the segment entry in the segment array 300, which eliminates the need to specifically store segment ID information.

In some embodiments, each entry in the segment array 300 comprises a segment score that is associated with the respective segment S1, S2, S3, S4, S5, S6, S7, S8, S9, S10, etc. For example, as shown in FIG. 3, the array entries for the respective segments S1, S8, S9, and S10 comprise a segment score of zero (0). In addition, the array entries for the respective segments S2, S6, and S7 comprise a segment score of −1. Further, the array entry for the segment S3 comprises a segment score of 50, the array entry for the segment S4 comprises a segment score of 100, and the array entry for the segment S5 comprises a segment score of 4. In some embodiments, the segment score of a given segment is determined as a function of the currently estimated fragmentation levels of the extents that are currently mapped to the given segment.

For example, in some embodiments, the segment score of a given segment is an accumulation or combination of the estimated fragmentation levels (e.g., percent of fragmentation) of the extents that are currently mapped to the given segment. In some embodiments, the segment score of a given segment is determined as an average, median, or maximum, etc., of the fragmentation levels of the extents that are currently mapped to the given segment. In some embodiments, a given segment having a segment score of zero (0) indicates that the extents mapped to the given segment are not fragmented, or that the data of the extents mapped to the given segment have been deleted and the capacity of the extents have been reclaimed for reuse. In some embodiments, a given segment having a segment score with a value of 100 indicates that all extents mapped to the given segment are essentially completely fragmented. Moreover, in some embodiments, a given segment having a segment score with a value between 0 (minimum value) and 100 (maximum value) indicates an overall degree of fragmentation level of the segment as determined based on some function of the estimated fragmentation levels of the extents that are currently mapped to the given segment of the extents mapped to the given segment.

Furthermore, in some embodiments, a segment score of, e.g., −1 is an indication that the fragmentation levels of the segment/extents are unknown at a given point in time. For example, there can be a circumstance in which the capacity of a given extent is unknown following a recovery process. In addition, in some embodiments, since the segment metadata information is maintained in volatile RAM, in the event of a failure and subsequent recovery, the segment metadata information (e.g., segment scores) can be rebuilt over time as the extents are allocated and used to store data, and the fragmentation levels of the extents are determined over time following recovery.

In some embodiments, default segment scores are automatically assigned to segments upon the occurrent of certain events. For example, as noted above, in some embodiments, following a failure and subsequent recovery, the segments are accorded a default segment score (e.g., score of −1) to indicate that fragmentation levels of the segment/extents are unknown. Furthermore, in some embodiments, following merging or splitting operations of extents, the segments that are mapped to such extents are accorded a default segment score (e.g., score of 100) on the assumption that the merged/split extents are likely highly fragmented. In addition, a given segment will be accorded a default segment score (e.g., score of 0) when the data of the extents currently mapped to the given segment has been deleted.

In some embodiments, priority levels for defragmenting extents are determined based on the fragmentation levels of the extents. For example, the priority levels can be assigned as high priority, medium priority, and low priority. An extent having a fragmentation level (score) which is greater than 85 can be accorded a high priority level such that the extent will be selected for defragmentation. An extent having a fragmentation level (score) in a range of about 50-85 can be accorded a medium priority level such that the extent will have a 50% chance of being selected for defragmentation, based on the current system state. Moreover, an extent having a fragmentation level (score) of less than 50 can be accorded a low priority level such that the extent will have a 25% change of being selected for defragmentation, based on the current system state.

While FIG. 3 illustrates an exemplary embodiment in which fragmentation scores are maintained for respective segments in a segment array 300 based on estimated fragmentation levels of the extents that are currently mapped to the respective segments, in other embodiments, fragmentation scores can be maintained for individual extents in an extent array. In such embodiments, the extent score for a given extent entry will indicate the estimated fragmentation level of the associated extent.

Figure 4:
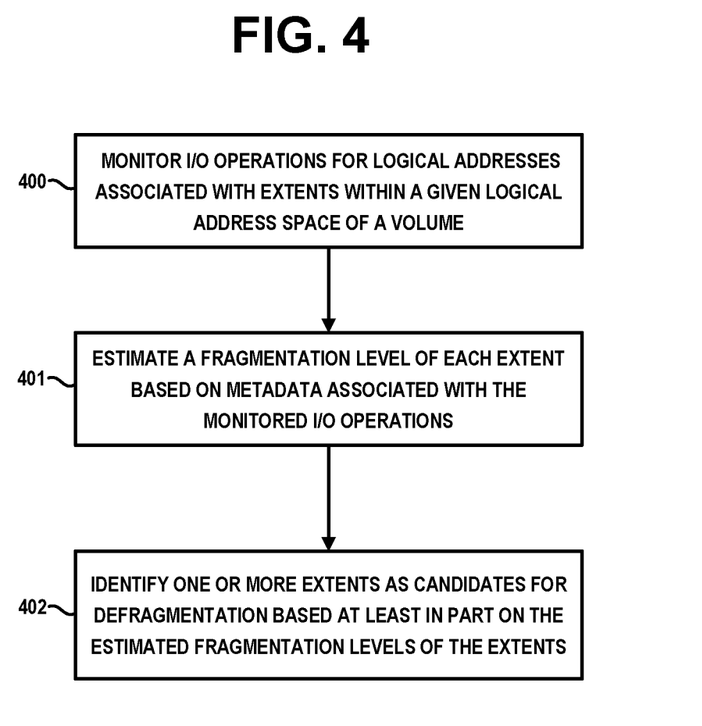
FIG. 4 illustrates a flow diagram of a method for intelligent defragmentation, according to an exemplary embodiment of the disclosure.
Figure 5:
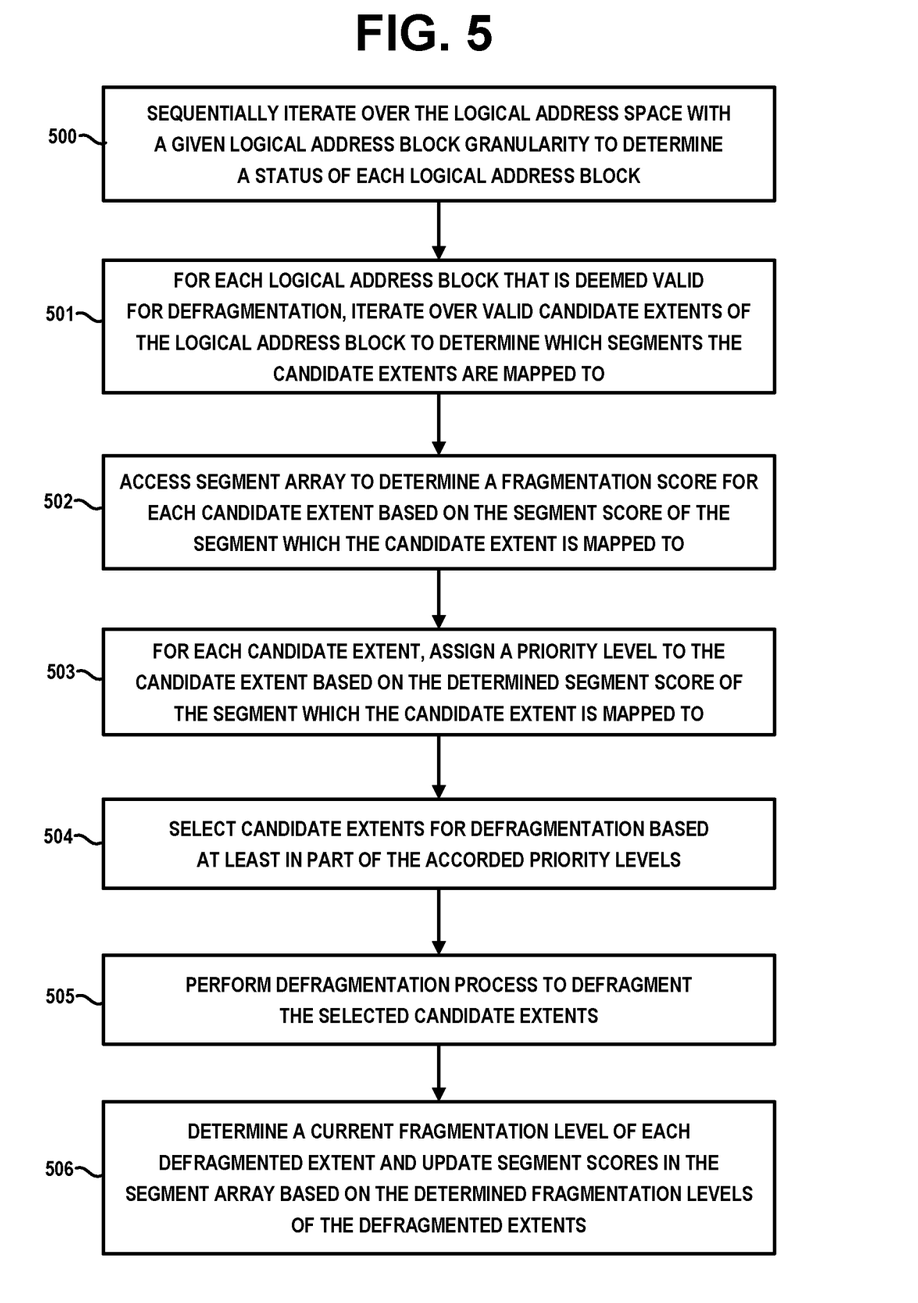
FIG. 5 illustrates a flow diagram of a method for intelligent defragmentation, according to another exemplary embodiment of the disclosure.

Exemplary methods for implementing intelligent defragmentation will now be discussed in conjunction with the flow diagrams of FIGS. 4 and 5. In some embodiments, the process flows shown in FIGS. 4 and 5 illustrate exemplary modes of operation of the intelligent defragmentation control system 250 of FIG. 2. Referring to FIG. 4, the intelligent defragmentation control system 250 monitors I/O operations (e.g., read/write access patterns) for logical addresses associated with extents within a given logical address space of a volume managed by the storage control system 150 (block 400). The storage control system 210 maintains and updates metadata associated with the I/O operations. The intelligent defragmentation control system 250 estimates fragmentation levels of respective extents based on the metadata associated with the monitored I/O operations (block 401). The intelligent defragmentation control system 250 identifies one or more extents as candidates for defragmentation based at least in part on the estimated fragmentation levels of the extents (block 402).

More specifically, in the context of the process flow of FIG. 4, the intelligent defragmentation control system 250 is configured to monitor and track I/O flow patterns (via the I/O flow monitoring module 251) to determine various types of information including, but not limited to, which extents have been allocated for use, which extents have been reclaimed, which logical addresses within a given extent have been mapped to physical addresses, data access patterns for logical addresses, etc. In this regard, the intelligent defragmentation control system 250 utilizes existing storage control system functionalities to perform background monitoring and tracking of I/O flows to capture state information and utilize associated I/O metadata (which is naturally generated and maintained by the storage control system to support storage control functions) to estimate fragmentation levels of the extents. For example, in some embodiments, metadata information from the logical-to-physical mapping directory and cached logical-to-physical pages can be utilized to estimate fragmentation levels of extents.

The intelligent defragmentation control system 250 utilizes existing I/O processes and associated metadata (e.g., I/O state information) to perform functions such as (i) estimating fragmentation levels of extents/segments based on the I/0 state information, (ii) assign scores to segments based on the estimated fragmentation levels of the constituent extents, (iii) assign defragmentation priority levels to extents/segments based on, e.g., the estimated fragmentation levels/scores, the access frequency of extents/segments (warm or hot based on read access patterns), etc. The estimated fragmentation levels and defragmentation priority scores, etc., associated with segments of a segment array are determined and updated on a continuous basis using current monitored I/0 state information without requiring additional CPU cycles or locking operations to read the actual data to perform such functions. In this regard, the segment metadata is generated using already existing I/O state information, which eliminates the need to generate additional I/O logs, and potentially cause bottleneck or contention issues that may arise by having to separately capture state information for purposes of defragmentation, as is required for conventional defragmentation techniques. Indeed, conventional defragmentation techniques need to actually read the stored data or associated metadata to determine which portions of the storage capacity are fragmentated and need to be defragmented. The exemplary intelligent defragmentation techniques as disclosed herein are configured to maintain a memory efficient data structure (e.g., segment array) in RAM, which includes segment metadata (e.g., segment scores) that is used to identify candidate segments/extents for defragmentation.

While the segment array comprises metadata that is utilized to identify potential fragmented extents, in some embodiments, once such candidate extents are identified, an additional process flow is performed (e.g., process of FIG. 5) to actually select candidate extents for defragmentation. In particular, in some embodiments, the selection process is performed to ensure that, e.g., (i) the candidate extents identified are actually fragmented to a sufficient degree to warrant defragmentation, (ii) the candidate extents are not marked for, e.g., deletion or forward rebuild operations which would result in redundant or unneeded work if such extents were defragmented, (iii) the candidate extents are actually allocated and have not been reclaimed, etc. In particular, for forward rebuild operations, it is desired to avoid selecting candidate extents for defragmentation which are undergoing a forward rebuild to thereby ensure that the forward rebuild operations do not collide with the defragmentation process, since these parallel processes occurring at the same time would be accessing and modifying the same extents. In addition, for capacity reclaim operations, it is desirable to avoid selecting candidate extents for defragmentation which are undergoing capacity reclaim operations which would ultimately result in such extents being deleted and removed.

In this regard, it is to be noted that the actual selection of candidate extents for defragmentation is not a trivial matter, and the intelligent defragmentation control system 250 is configured to periodically update the segment array metadata to update the estimated fragmentation levels of the segments/extents and determine associated priority scores, which can significantly change as result of split, merger, or deletion operation, or other operations that can change the layout of the storage. In some embodiments, the intelligent defragmentation control system 250 operates in the background to periodically update the segment scores of the segments in the segment array (and other relevant metadata) to enable more accurate identification of potentially fragmented extents. In addition, in some embodiments, the intelligent defragmentation control system 250 is configured to perform self-correction operations to validate a fragmentation level of a given extent by reading one or more portions of the given extent which are believed to be fragmented, determining an actual fragmentation level of the given extent, and updating the current fragmentation level and/or priority score of the given extent accordingly. In some embodiments, the self-correction operations are performed in conjunction with a defragmentation process.

As noted above, once candidate extents are identified, a process is performed to actually select candidate extents for defragmentation, the details of which will now be discussed in further detail in conjunction with FIG. 5. Referring to FIG. 5, the process for selecting candidate extents for defragmentation begins with the intelligent defragmentation control system 250 sequentially iterating over the logical address space with a given logical address block granularity (e.g., 8 MB octet ordinal) to determine the status of each logical address block, e.g., each octet (block 500). For example, for each logical address block (e.g., octet), a determination is made as to whether the logical address block is valid for defragmentation (e.g., whether logical address block is actually allocated and being used, not marked for deletion, not being rebuilt, etc.). In some embodiments, the intelligent defragmentation control system 250 utilizes, e.g., the logical-to-physical mapping directory and/or some other existing metadata structure(s) to determine the validity of the octets, and the status of the octets (e.g., marked for deletion, reclaim, rebuild, etc.). In some embodiments, a separate metadata structure is maintained and continually updated to include a list of valid octets, which eliminates the need to perform the iteration process (block 500). In some embodiments, during the iteration process (of block 500), if a given octet ordinal is locked via a try-lock process, it is assumed that the given address space is in use and, thus, not currently considered for defragmentation.

For each logical address block (e.g., 8 MB octet) that is deemed valid for defragmentation, the intelligent defragmentation control system 250 iterates over the valid extents of the logical address block to determine which segments the valid extents are mapped to (block 501). For example, in some embodiments where each extent is 128 KB, the intelligent defragmentation control system 250 will sequentially iterate over the 8 MB octet in blocks of 128 KB. The intelligent defragmentation control system 250 then accesses the in-RAM segment array (e.g., segment array 300, FIG. 3) to determine a fragmentation score for each valid extent based on the segment score of the segment to which the valid extent is mapped (block 502). In addition, in some embodiments, the intelligent defragmentation control system 250 will access the cached logical-to-physical pages 274 (FIG. 2) to determine a warmness or hotness of each valid extent based on the warmness or hotness of the associated segments contained in the cached logical-to-physical pages 274. In this regard, the access information regarding the extents that have been recently and frequently accessed can be utilized to assign priority levels to candidate extents for defragmentation.

The intelligent defragmentation control system 250 will then assign a priority level (e.g., high priority, medium priority, low priority) for a given candidate extent based on the segment score of the associated segment mapped to the candidate extent (block 503). As noted above, in some embodiments, the assigned priority level is further based on the determined warmness or hotness of the extent (e.g., extents that have been recently and/or frequently accessed can be accorded a higher priority for defragmentation). The candidate extents will then be selected for defragmentation based at least in part of the accorded priority levels (block 504). For example, in some embodiments, all candidate extents with a "high" priority level are selected for defragmentation. Further, in some embodiments, 50% of the candidate extents with a "medium" priority level are selected for defragmentation. Moreover, in some embodiments, 25% of the candidate extents with a "low" priority level are selected for defragmentation.

For each candidate extent that was selected for defragmentation, the intelligent defragmentation control system 250 commences a defragmentation operation (via the extent defragmentation control module 255) to defragment the selected extents (block 505). For example, for each extent, a defragmentation operation comprises an acquire and synchronization operation which reads the physical data associated with the extent, aggregates the data, computes a remaining fragmentation level (if any), and then writes the aggregated data to a single contiguous location in storage. The intelligent defragmentation control system 250 then determines a current fragmentation level of the defragmented extents and updates the segment scores in the segment array based on the currently determined fragmentation levels of the extents resulting from the defragmentation process (block 506). As noted above, an adaptive defragmentation throttling process can be implemented to control the pace of the defragmentation operation to ensure that the performance level of the defragmentation process has a minimal impact on I/O processing performance and provides increased performance for rebuilds.

Figure 6:
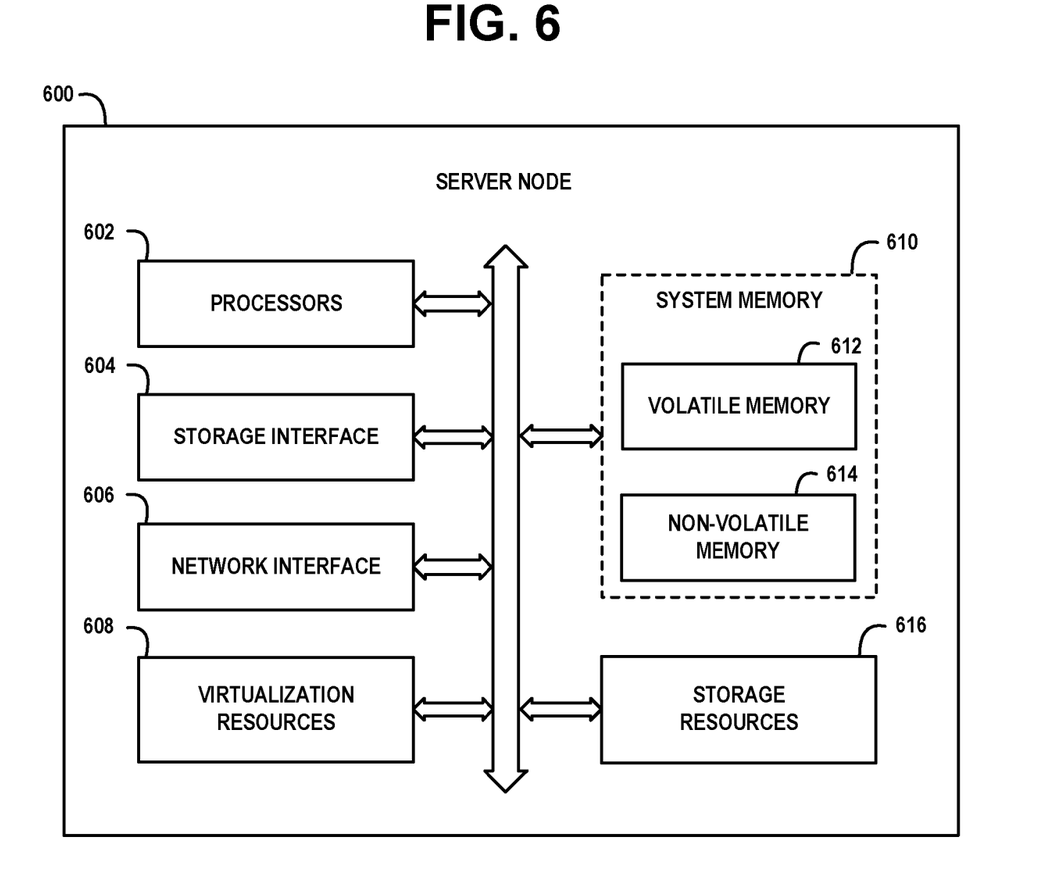
FIG. 6 schematically illustrates a framework of a server for hosting a storage control system which implements an intelligent defragmentation control system, according to an exemplary embodiment of the disclosure.

FIG. 6 schematically illustrates a framework of a server for hosting a storage control system which implements an intelligent defragmentation control system, according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of a host connectivity management system as discussed herein. In some embodiments, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities of a storage control node and intelligent defragmentation control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage control systems and intelligent defragmentation control systems are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs.

Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
managing, by a storage control system, a logical address space of at least one volume, wherein the logical address space comprises a set of logical addresses that is partitioned into a plurality of extents, wherein each extent comprises a respective contiguous block of logical addresses of the logical address space, and wherein logical addresses within one or more extents of the plurality of extents are mapped to respective physical addresses of at least one storage device;
generating and maintaining, by the storage control system, metadata associated with input/output (I/O) operations performed on the physical addresses of the at least one storage device, wherein the metadata comprises logical address-to-physical address mapping information for the one or more extents;
utilizing, by the storage control system, the metadata associated with the I/O operations to periodically determine current fragmentation levels of the extents, wherein the current fragmentation level of a given extent is determined based at least in part on a fragmentation level of the physical addresses which are mapped to the logical addresses of the given extent;
maintaining, by the storage control system, the current fragmentation levels of the extents in an in-memory data structure, wherein the in-memory data structure comprises an array of elements wherein each element in the array comprises a value that represents the determined current fragmentation level of one or more extents associated with the element or, depending on an occurrence of a given event associated with the one or more extents associated with the element, a default value that represents a default fragmentation level that the storage control system assigns to the element based on the occurrence of a given event associated with the one or more extents associated with the element; and
identifying, the storage control system, one or more extents as candidates for defragmentation, based at least on the current fragmentation levels of the extents as represented by the respective values in the in-memory data structure.

2. The method of claim 1, wherein the current fragmentation level of the given extent is further determined based at least in part on an amount of unused logical addresses between used logical addresses within the given extent.

3. The method of claim 1, wherein the default value comprises one of (i) a first default value which indicates that the one or more extents associated with the element have been deleted, and (ii) a second default value which indicates that a fragmentation level of the one or more extents associated with the element is unknown.

4. The method of claim 1, wherein each element in the array of elements is associated with a respective segment of a plurality of segments, and wherein the method further comprises:
determining, by the storage control system, a segment score for each segment of the plurality of segments, wherein each segment maps to one or more extents, wherein the segment score for a given segment is determined as a function of the current fragmentation levels of the one or more extents that are mapped to the given segment; and
utilizing, by the storage control system, the segment scores of the segments to identify candidate extents for defragmentation.

5. The method of claim 4, wherein each segment of the plurality of segments corresponds to a respective logical-to-physical metadata page.

6. The method of claim 1, further comprising selecting, by the storage control system, one or more of the identified candidate extents for defragmentation, which are determined to be currently allocated, and not marked for one of deletion and forward rebuild.

7. The method of claim 1, further comprising:
selecting, by the storage control system, one or more of the identified candidate extents for defragmentation;
assigning, by the storage control system, a priority level to each selected extent based at least in part on the current fragmentation level of the selected extent; and
determining, by the storage control system, whether to defragment a given selected extent based at least in part of the assigned priority level of the selected extent.

8. The method of claim 7, wherein the priority level is assigned to the selected extent is based at least in part on the current fragmentation level and an access frequency of the selected extent.

9. The method of claim 1, further comprising:
  selecting, by the storage control system, one or more of the identified candidate extents for defragmentation;
  defragmenting, by the storage control system, the one or more selected extents;
  determining, by the storage control system, a fragmentation level of each defragmented extent; and
  updating, by the storage control system, the in-memory data structure the current fragmentation level of the defragmented extent to include the determined fragmentation level of the defragmented extent.

10. An article of manufacture comprising a non-transitory processor-readable storage medium having stored therein program code of one or more software programs, wherein the program code is executable by one or more processors to implement a method which comprises:
  managing, by a storage control system, a logical address space of at least one volume, wherein the logical address space comprises a set of logical addresses that is partitioned into a plurality of extents, wherein each extent comprises a respective contiguous block of logical addresses of the logical address space, and wherein logical addresses within one or more extents of the plurality of extents are mapped to respective physical addresses of at least one storage device;
  generating and maintaining, by the storage control system, metadata associated with input/output (I/O) operations performed on the physical addresses of the at least one storage device, wherein the metadata comprises logical address-to-physical address mapping information for the one or more extents;
  utilizing, by the storage control system, the metadata associated with the I/O operations to periodically determine current fragmentation levels of the extents, wherein the current fragmentation level of a given extent is determined based at least in part on a fragmentation level of the physical addresses which are mapped to the logical addresses of the given extent;
  maintaining, by the storage control system, the current fragmentation levels of the extents in an in-memory data structure, wherein the in-memory data structure comprises an array of elements wherein each element in the array comprises a value that represents the determined current fragmentation level of one or more extents associated with the element or, depending on an occurrence of a given event associated with the one or more extents associated with the element, a default value that represents a default fragmentation level that the storage control system assigns to the element based on the occurrence of a given event associated with the one or more extents associated with the element; and
  identifying, the storage control system, one or more extents as candidates for defragmentation, based at least on the current fragmentation levels of the extents as represented by the respective values in the in-memory data structure.

11. The article of manufacture of claim 10, wherein the default value comprises one of (i) a first default value which indicates that the one or more extents associated with the element have been deleted, and (ii) a second default value which indicates that a fragmentation level of the one or more extents associated with the element is unknown.

12. The article of manufacture of claim 10, wherein each element in the array of elements is associated with a respective segment of a plurality of segments, and wherein the article of manufacture further comprises program instructions that are executable by the one or more processors to perform a method which comprises:
  determining, by the storage control system, a segment score for each segment of the plurality of segments, wherein each segment maps to one or more extents, wherein the segment score for a given segment is determined as a function of the current fragmentation levels of the one or more extents that are mapped to the given segment;
  maintaining, by the storage control system, the segment scores in the in-memory data structure; and
  utilizing, by the storage control system, the segment scores of the segments to identify candidate extents for defragmentation;
  wherein each segment of the plurality of segments corresponds to a respective logical-to-physical metadata page.

13. The article of manufacture of claim 10, further comprising program instructions that are executable by the one or more processors to perform a method which comprises selecting, by the storage control system, one or more of the identified candidate extents for defragmentation, which are determined to be currently allocated, and not marked for one of deletion and forward rebuild.

14. The article of manufacture of claim 10, further comprising program instructions that are executable by the one or more processors to perform a method which comprises:
  selecting, by the storage control system, one or more of the identified candidate extents for defragmentation;
  assigning, by the storage control system, a priority level to each selected extent based at least in part on the current fragmentation level of the selected extent; and
  determining, by the storage control system, whether to defragment a given selected extent based at least in part of the assigned priority level of the selected extent.

15. The article of manufacture of claim 14, wherein the priority level is assigned to the selected extent is based at least in part on the current fragmentation level and an access frequency of the selected extent.

16. The article of manufacture of claim 10, further comprising program instructions that are executable by the one or more processors to perform a method which comprises:
  selecting, by the storage control system, one or more of the identified candidate extents for defragmentation;
  defragmenting, by the storage control system, the one or more selected extents;
  determining, by the storage control system, a fragmentation level of each defragmented extent; and
  updating, by the storage control system, the current fragmentation level of the defragmented extent to include the determined fragmentation level of the defragmented extent.

17. An apparatus, comprising:
  at least one processor; and
  memory configured to store program code, wherein the program code is executable by the at least one processor to instantiate a storage control system, wherein the storage control system is configured to:
    manage a logical address space of at least one volume, wherein the logical address space comprises a set of logical addresses that is partitioned into a plurality of extents, wherein each extent comprises a respective contiguous block of logical addresses of the logical address space, and wherein logical addresses within one or more extents of the plurality of extents are mapped to respective physical addresses of at least one storage device;

generate and maintain metadata associated with input/output (I/O) operations performed on the physical addresses of the at least one storage device, wherein the metadata comprises logical address-to-physical address mapping information for the one or more extents;

utilize the metadata associated with the I/O operations to periodically determine current fragmentation levels of the extents, wherein the current fragmentation level of a given extent is determined based at least in part on a fragmentation level of the physical addresses which are mapped to the logical addresses of the given extent;

maintain the current fragmentation levels of the extents in an in-memory data structure, wherein the in-memory data structure comprises an array of elements wherein each element in the array comprises a value that represents the determined current fragmentation level of one or more extents associated with the element or, depending on an occurrence of a given event associated with the one or more extents associated with the element, a default value that represents a default fragmentation level that the storage control system assigns to the element based on the occurrence of a given event associated with the one or more extents associated with the element; and identify one or more extents as candidates for defragmentation, based at least on the current fragmentation levels of the extents as represented by the respective values in the in-memory data structure.

18. The apparatus of claim 17, wherein each element in the array of elements is associated with a respective segment of a plurality of segments, and wherein the storage control system is configured to:

determine a segment score for each segment of the plurality of segments, wherein each segment maps to one or more extents, wherein the segment score for a given segment is determined as a function of the current fragmentation levels of the one or more extents that are mapped to the given segment;

maintain the segment scores in the in-memory data structure; and utilize the segment scores of the segments to identify candidate extents for defragmentation;

wherein each segment of the plurality of segments corresponds to a respective logical-to-physical metadata page.

19. The apparatus of claim 17, wherein the storage control system is configured to select one or more of the identified candidate extents for defragmentation, which are determined to be currently allocated, and not marked for one of deletion and forward rebuild.

20. The apparatus of claim 17, wherein the storage control system is configured to:

select one or more of the identified candidate extents for defragmentation;

assign a priority level to each selected extent based at least in part on the current fragmentation level of the selected extent;

determine whether to defragment a given selected extent based at least in part of the assigned priority level of the selected extent;

defragment one or more of the selected extents;

determine a fragmentation level of each defragmented extent; and update the current fragmentation level of the defragmented extent to include the determined fragmentation level of the defragmented extent.

* * * * *